INVENTOR.
GUSTAF ARRHENIUS
BY Fulwider, Patton, Rieber, Lee, and Utecht
ATTORNEYS INVENTOR.
GUSTAF ARRHENIUS
BY Fulwider, Patton, Rieber, Lee, and Utecht
ATTORNEYS INVENTOR.
GUSTAF ARRHENIUS
BY Zulwider, Patton, Rieber, Lee, and Utecht
ATTORNEYS United States Patent Office 3,423,517
Patented Jan. 21, 1969

3,423,517
MONOLITHIC CERAMIC ELECTRICAL INTERCONNECTING STRUCTURE

Gustaf Arrhenius, La Jolla, Calif., assignor to Dielectric Systems, Inc., La Jolla, Calif., a corporation of California Filed July 27, 1966, Ser. No. 568,283
U.S. Cl. 174—68.5 6 Claims
Int. Cl. H05k 1/04

ABSTRACT OF THE DISCLOSURE

A microelectronic circuit device having circuitry compatibly encapsulated within a sintered monolithic ceramic body, the circuitry including highly conductive electrical interconnection means formed by metallizing the ceramic prior to firing in a reducing atmosphere, the metallizing medium comprising a mixture of a first metal selected from the group consisting of silver, gold and copper and a second metal selected from the group consisting of molybdenum and tungsten.

This invention relates to the formation of high-strength, extremely environmentally resistant, highly thermally conductive, monolithic electrical interconnecting systems with very low circuit resistivities, and relates especially to a novel, highly improved monolithic ceramic structure containing electrical components, such as circuit patterns, resistors, capacitors and inductors.

Hitherto, the most generally utilized board structures incorporating electrical elements, such as circuit patterns (generally known as printed circuit boards) were of three main types. The first type may be characterized broadly as having a plastic substrate or structure which might or might not be reinforced and onto which a circuit pattern, or other electrical component is affixed. The second main type is a glass structure or substrate onto which a circuit pattern, or other electrical component is deposited or otherwise affixed. The third main type relates to the use of a sintered ceramic structure or substrate onto which a circuit pattern, or other electrical component is deposited or otherwise affixed. Each of the above three main types of substrates or structures has substantial disadvantages, however, some of which will be outlined below.

Plastic circuit boards, the first main type, such as the well known glass-epoxy imprinted circuit boards, comprise, in general, a metal circuit pattern laid down upon a plastic or reinforced plastic substrate. The substrate is not truly high-temperature resistant; it cannot compare with ceramic materials in its heat resistance. Second, plastic substrates are not good heat dissipators, and therefore, a high component density cannot be attained. Thirdly, plastic substrates are subject to attack by oxidizing agents. Fourthly, plastic materials cannot be hermetically sealed. Fifthly, the coefficient of thermal expansion of plastic materials is much higher than that for metals, and in high temperature environments, the metal circuit patterns may well be strained and rendered discontinuous because of the differential thermal expansion.

Still further, plastic materials are not radiation resistant, and have low flexural strength whereby the circuit patterns can be rather readily separated from the substrate. In addition to all of the foregoing, it is inherently difficult to plate through holes in a plastic substrate.

In view of these drawbacks in the manufacture and use of plastic circuit boards, the industry has long sought to effectively combine ceramic materials with metals, whereby to avoid the limitations imposed by plastic substrates. Such efforts, to my knowledge, have not been completely successful for the reasons set forth hereafter.

The deposition of metal patterns on thin layer ceramics, e.g., alumina, has been accomplished to produce ceramic circuit boards, but, in general, the ceramic circuit boards, of which I am aware, were pre-fired, i.e., sintered, prior to the time of application of the metal or metal alloy pattern. The ceramic substrates are formed from a slurry of raw, unfired ceramic particles in a plastic or resin binder, the slurry being maintained in a liquid state by the presence of a volatile solvent. The slurry is cast and the solvent evaporated. A relatively flexible, plastic "green" sheet results. The green ceramic sheet is then usually fired in air, at sufficiently high temperatures, in order to burn off the plastic binders and sinter the green ceramic. An essentially pure, fired ceramic results.

The desired metal pattern is then deposited on the pre-fired ceramic and the composite is heated at high temperatures to improve adherence of metal to ceramic. Sintering of the green ceramic after the application of the metal composition has not been employed for several important reasons. Perhaps the most important reason is that sintering of the usual green ceramic materials is usually performed in air in order to burn off the organic materials forming the slurry, and the metal components would readily oxidize at the high temperatures required for sintering.

In order to encapsulate such ceramic circuit boards and avoid exposure of the circuit to detrimental environmental conditions, a number of these ceramic boards may be made up in sandwich form, one layer carrying the metal circuit, the next adjacent layer being insulative, except for plated through-hole connections, and carrying another circuit pattern, and the next adjacent layer being insulative and carrying additional circuit patterns, and so on. Such a hybrid structure may be held together by plastic resins or by glass.

The plastic resins are only temperature resistant to the extent of 200° to 250° C. over relatively short periods of time, e.g., days or hours at best. Thus, the hybrid ceramic circuit boards are of limited use in continually high-temperature environments, and are only as chemically resistant as are the adhesives employed to hold the multiple ceramic layers in a single unitary mass. The plastic resin layers, required for adhesive purposes, act as thermal barriers between the various circuit layers and limit the component density severely. Also, there is a problem posed by the differential thermal expansion between the ceramic plastic and metals.

If glass is employed to hold the multiple ceramic layers together in a single unitary mass, the glass severely limits the component density of the unitary mass, since it acts as a thermal barrier between the various circuit layers. Also, there can be a very substantial difference in thermal expansion between the glass and the ceramic which can readily result in a stressed structure and one subject to damage or breakage.

Glass circuit boards have also been made and utilized, but these boards are extremely expensive and very delicate. The glass circuit boards are not widely used; glass is not very strong, and it forms a heat barirer much as do the plastic resins set forth above.

For the purposes of the present specification and claims, I will define a monolithic ceramic electrical interconnection system (MCEIS) as that which is composed of a fired ceramic structure or unit within which is contained a metal or combination of metals forming an electrically conductive pattern, or other electrically interconnecting element, and which is not held together by any extraneous binders.

The electronics industry has not only long sought a monolithic ceramic electrical interconnection system having one or more electrical interconnecting units of low resistivity, but has sought a system that has high strength and that in relation to the prior art occupies a very small volume, for any given amount of circuit patterns or the like incorporated therein. The high-conductivity circuitry should be encapsulated within the ceramic in order to avoid the aforementioned disadvantages of the prior art, such as chemical attack and degradation at prolonged high temperatures. The small volume to component ratio desired requires that the ceramic be a good heat dissipator and highly electrically insulating.

The monolithic system must be relatively inexpensive to manufacture and have high reliability and reproducibility of the conductivity of the electrically connecting components of the structure. Also, the monolithic structure may be required to have high tensile, compressive, flexural and impact strength, be impervious to gas, be unaffected by oxidizing agents, have ceramic and metal matching thermal coefficients of expansion, and have favorable heat dissipation properties.

In view of the foregoing, it is a major object of the vide a novel and economical monolithic ceramic electrical interconnection system comprising one or more electrically connecting components or circuit patterns that meets or exceeds the physical characteristics, the chemical resistance, or the heat dissipation and hermeticity of the prior art hybrid metallized ceramic structures.

It is another object of the present invention to provide a novel and economical monolithic ceramic electrical interconnection system which comprises essentially a fired ceramic, such as one containing predominantly alumina, within which is contained a metallic composition of relatively low cost, said ceramic being refractory, hermetically sealed, and highly heat dissipating.

A further object of this invention is to provide a means for making a monolithic ceramic electrical interconnecting system wherein a metal combination is provided having such surface tension and other physical properties that it remains in a predetermined path at the firing temperature of the ceramic while retaining a very low electrical resistivity.

The means for attaining these and other objects of the invention will become apparent by reference to the following detailed description and to the accompanying drawings, wherein.

Figures 2, 3, 4, 5:
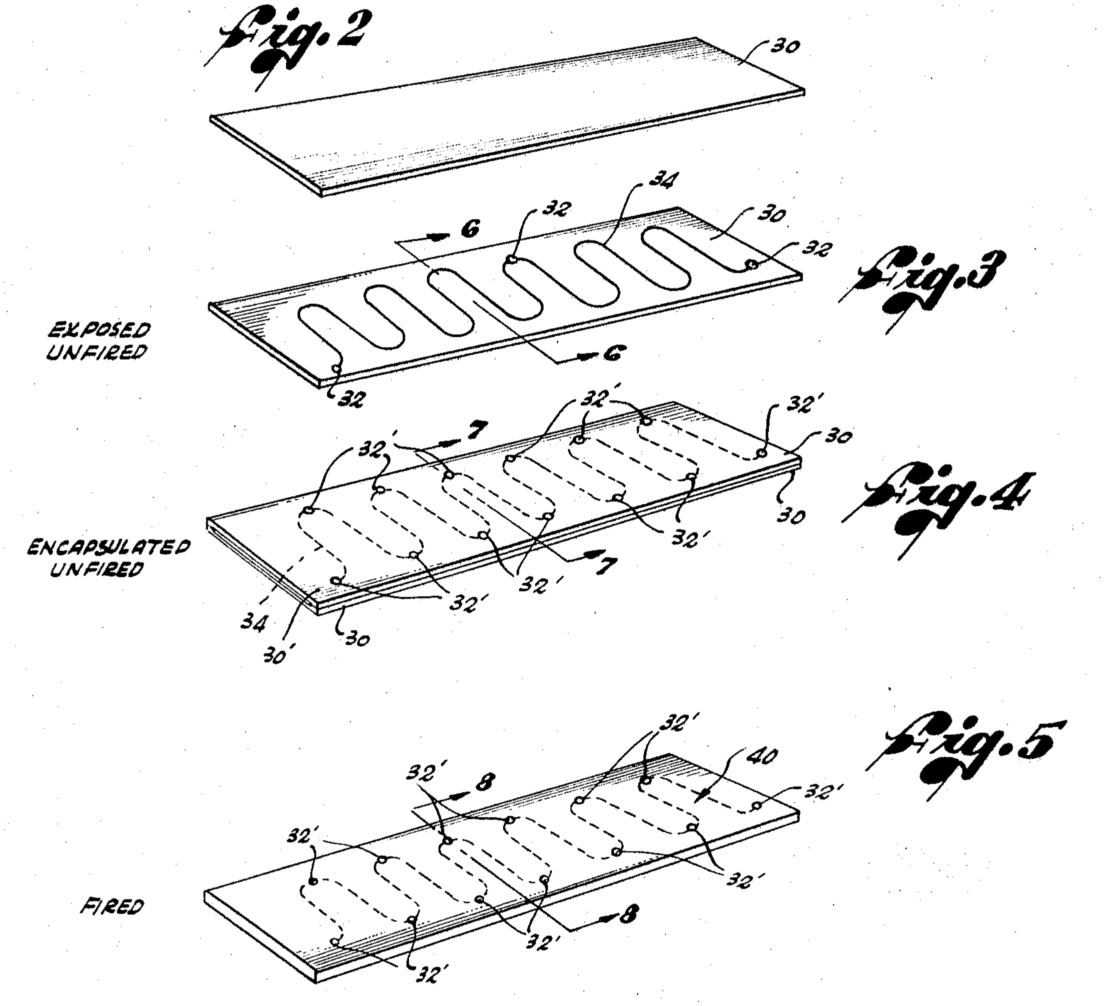
FIGURE 2 is a perspective view of a portion of unfired ceramic sheet material prior to the application of a metallic circuit thereon.
FIGURE 3 is a perspective view of the unfired ceramic material of FIGURE 2 after application of a metallic circuit pattern thereon.
FIGURE 4 is a perspective view of the unfired ceramic material of FIGURE 3 after its encapsulation and lamination with a second sheet of unfired ceramic sheet material.
FIGURE 5 is a perspective view of the ceramic material of FIGURE 4 resulting from the firing thereof.
Figure 6:
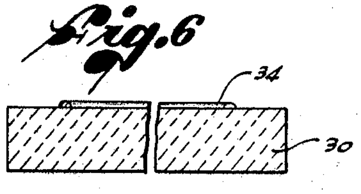
Figure 7:
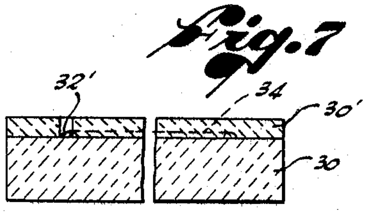
Figure 8:
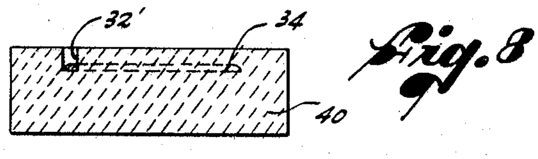
Figure 10:
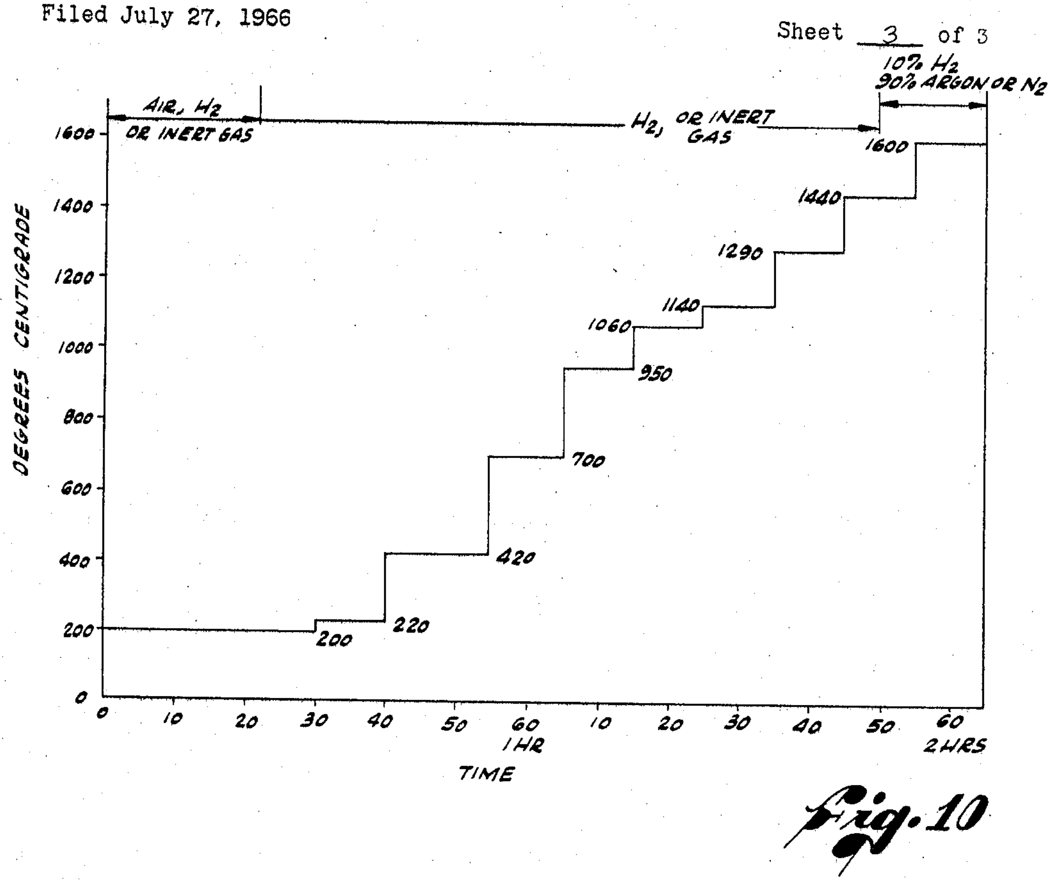
Figure 9:
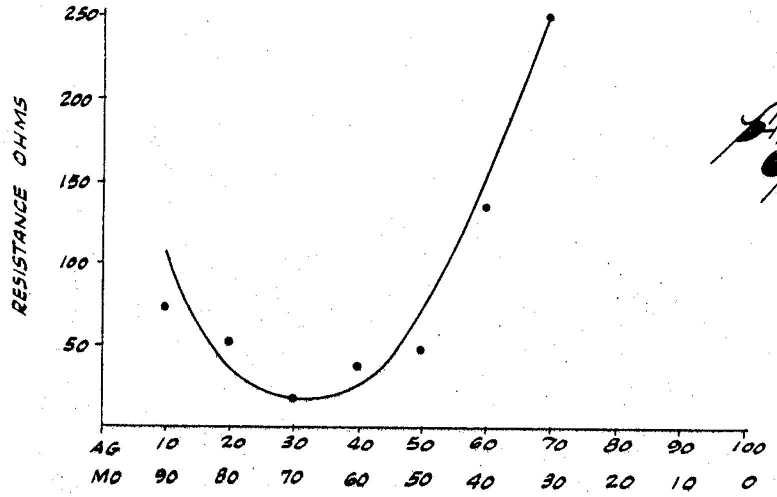

FIGURES 6–8 are enlarged cross-sectional views taken along lines 6—6, 7—7, and 8—8 of FIGURES 3, 4 and 5, respectively;

FIGURE 9 is a curve showing the actually observed change of resistivity with change in constituents of metal components fired at very high temperatures; and FIGURE 10 is a typical firing profile curve employed in my invention.

In general, my invention resides in the formation of a monolithic electrical interconnection system, e.g., an electrical circuit pattern, which comprises the following:

(a) a sintered monolithic ceramic material; and (b) encapsulated within said monolithic ceramic material is a two-phase metallic component combination or system wherein one of the metals has a melting point below the sintering temperature of said ceramic, and the other metal of said metallic combination is a refractory metal having a melting point substantially above the sintering range of said ceramic material. The refractory metal has at least a slight solubility in the lower melting point and the lower melting point metal also has a sufficiently low surface tension relative to the refractory metal and a sufficiently low vapor pressure at the sintering temperature, whereby said electrical pattern or other interconnecting unit achieves a stable dimensional configuration and a very high conductivity.

The two-phase metal system is deposited on a green ceramic substrate in a particular configuration, as will be described in detail, and is encapsulated by an additional layer or layers of green ceramic. Appropriate interconnection holes are made and the whole assembly is then sintered under specific processing conditions, to be described, to form the monolithic ceramic electrical interconnection system.

The particular metal system laid down to form the circuit pattern must meet several important criteria. The metal leads must display optimal conductivity after firing of the ceramic material to form the monolithic structure. The circuit pattern must also accurately retain its predetermined configuration. This leads to subsidiary considerations. The metal must not spread into the pores of the ceramic material at any time prior to or during the firing procedure; however, the surface tension of the liquid metal must at the same time be low enough to preclude the development of discontinuities in the metal circuit during the firing process. Furthermore, the thermal expansion characteristics of the metal system must be matched to those of the ceramic to preclude disruptive deformation and excessive residual strain in either component. The metal composition must therefore retain its dimensional and electrical integrity under a wide variety of temperature and environmental conditions.

It has been discovered that a two-phase metal system, where one phase is characterized by a high electrical conductivity and the other by a high or intermediate conductivity, is required to produce the desired results. The metal combination must be such that at the highest temperature employed during the firing, one metal will have melted whereas the other will not; further, the liquid phase so obtained must have a low surface tension relative to the refractory metal in order to achieve complete void filling, which is necessary to create a conductor of optimal configuration. This necessary surface tension relationship is coupled to a considerable solubility (several mole percent) of the refractory metal in the liquid at maximum firing temperature. This high-temperature solubility is used to advantage also for a different purpose. If, as in the present case, the refractory component is a group *6b* or *5b* metal and the liquid phase is a group 1*b* metal, the solubility at high temperature of the refractory metal in the liquid metal phase imparts to said liquid metal phase sufficient reactivity to also cause the desired wetting of the ceramic substrate, which would otherwise not take place. However, it is also necessary that the solubility-temperature relationship in the metallic system be such that quite complete exsolution of the solute (the refractory metal) is achieved at low temperature. If this condition is not fulfilled, impurity scattering leads to drastically increased electrical resistivity.

Further requirements on the component metals are sufficiently low vapor pressure at the firing temperature to preclude excessive migration in the vapor phase, and sufficient inertness in relation to the ceramic to prevent its deterioration.

When the above outlined criteria are fulfilled, it is possible to obtain dimensional integrity of the metal pattern laid down, while achieving an electrical conductor with very low electrical resistivity (less than 0.1 ohm per square dimension and 1 mil thickness, without annealing). The refractory metal grains remain in the predetermined pattern, unperturbed, except for sintering, and form a three-dimensional network with intermediate electrical conductivity. The interstices between the refractory metal grains retain the solidified liquid phase, which forms another continuous network with a very high electrical conductivity. Without the refractory component, the group 1*b* metal would not remain extended in the predetermined conductor pattern, but would at sintering have tended to, and particularly upon melting, coalesce into disconnected droplets, due to their high surface tension relative to the ceramic.

The concentration of refractory metal dissolved in the liquid phase reaches its highest value at maximum firing temperature. At cooling, exsolution commences in the melt, but a considerable fraction of the refractory metal is retained in the subsolidus region, partly in equilibrium, partly due to supersaturation particularly at rapid cooling. Under these circumstances, the surface tension of the liquid of the alpha phase, both relative to the refractory metal and to the ceramic, remains favorable until any bulk motion of the metal has been arrested by freezing. The continued exsolution proceeds rapidly enough at elevated temperature so that the ideal electrical conductivity of the pure end member is approached within a factor of two or three without special precautions. In special applications where the ultimate optimum in conductivity is needed, this can be approached by extended annealing of the fired metal-ceramic system at an elevated temperature of at least 200° C. and preferably at about 400–500° C.

The presently preferred metal compositions are gold, copper or silver, on the one hand, together with molybdenum or tungsten, on the other. It is found that the specific combinations of gold and molybdenum, silver and molybdenum, copper and molybdenum, gold and tungston, silver and tungsten, and copper and tungsten fulfill the necessary and desirable conditions outlined above. Of the metals, gold, copper and silver, the latter one possesses the most favorable surface tension characteristics relative to the refractory metal, and also has the highest specific electrical conductivity. It is furthermore advantageous because of its chemical inertness compared to copper, and the low cost compared to gold. Group 5*b* metals, niobium and tantalum, may also be used in this invention as the refractory metal component but are not presently preferred.

The metal compositions are carried in a vehicle, the composition of which varies over a wide range of substances. The vehicle is generally a relatively volatile solvent, e.g., a hydrocarbon, and is conventionally used to carry metallic powders in suspension. Examples of such vehicles are toluene and/or pine oil.

The method for making the monolithic ceramic system of my invention comprises the following steps:

(a) admixing 50% or more of a finely divided or powdered ceramic material (or mixture of ceramic materials) with a plastic resin binder, plasticizers, and volatile solvent to make a flowable mass; (Step 10, FIG. 1)

(b) casting or otherwise forming the flowable mass into a thin sheet; (Step 12, FIG. 1)

(c) building up the sheet thickness, if necessary, to any desired thickness by lamination of sheets under pressure and/or heat for a short period of time. The resulting sheet is very flexible and can be readily handled without breaking; (Step 12*a*, FIG. 1)

(d) applying a predetermined hole pattern which is to register with the metal-containing ink forming the lines of the desired circuit pattern; (Step 13, FIG. 1) (This step is not required for every lamination.)

(e) applying the desired circuit pattern to the unfired sheet by any one of a number of conventional methods, e.g., silk screening, and also by nonconventional methods. Thus, a particular metal or metal composition is here employed which may be carried in a volatile vehicle such as pine oil or turpentine (which does not affect the plastic resin binders or other components of the unfired ceramic sheet). The metal composition, in a volatile vehicle, is referred to in the silk screening art as an ink, and will be referred to herein as an ink; (Step 14, FIG. 1)

(f) placing a second unfired thin green ceramic sheet prepared in accordance with steps set forth above on the first unfired ceramic layer to encapsulate the circuit pattern and laminating said second sheet to the first layer under heat and/or pressure; (Step 18, FIG. 1)

(g) an additional unfired ceramic sheet carrying thereon a circuit pattern and having appropriate interconnection holes may be added to the pair of ceramic sheets heretofore described, before the lamination thereof, depending on the required configuration; many alternating layers of ceramic and metal may thereby be built up in a single composite unit under pressure and/or heat; (Step 18*a*, FIG. 1).

Figure 1:
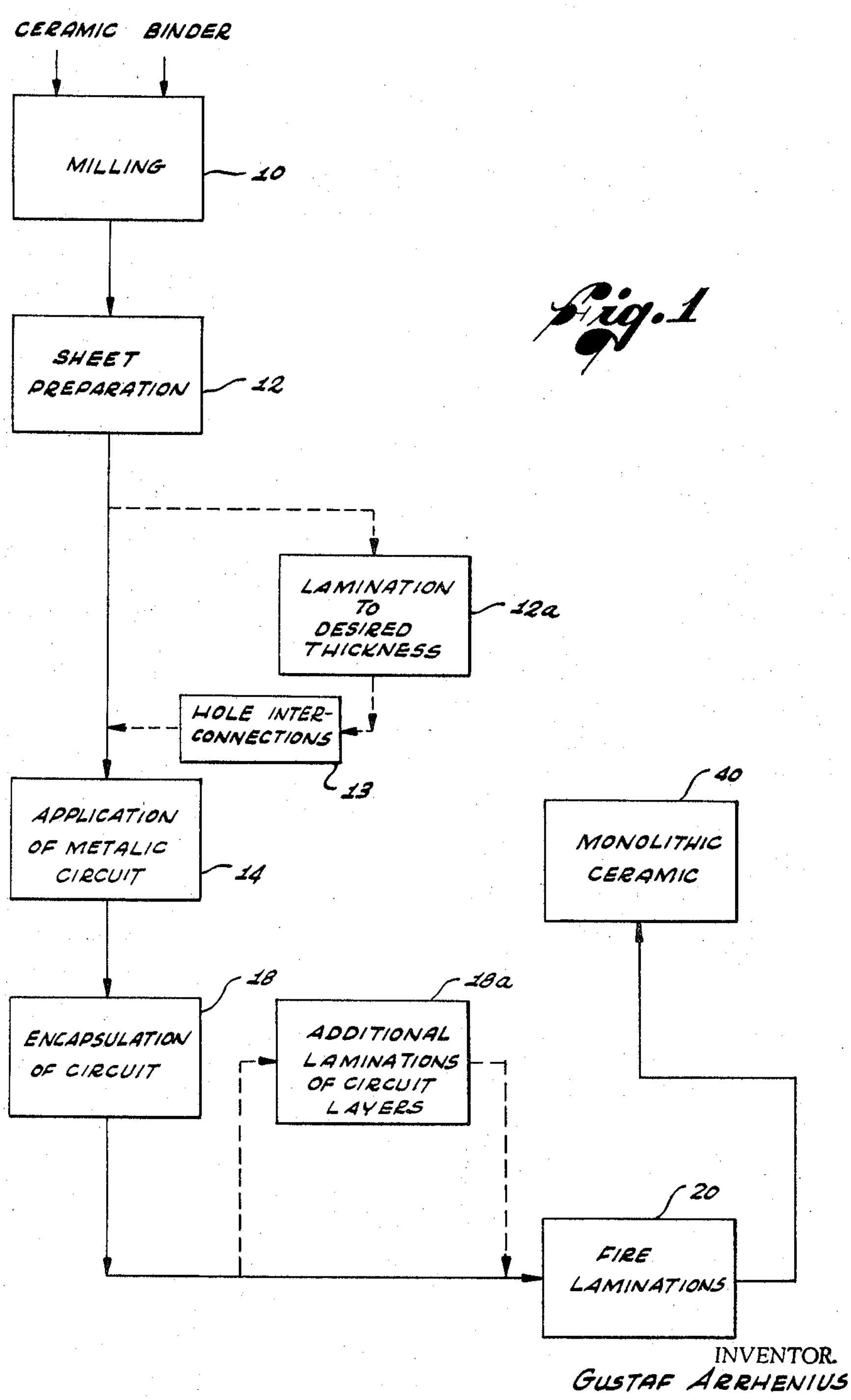
FIGURE 1 is a schematic representation of the steps of my novel process for the manufacture of the monolithic metallized ceramic of this invention.

(7) The composition unit is then fired in a non-oxidizing atmosphere. The atmosphere may be partially or wholly reducing in nature as well. The temperature is preferably raised slowly, in a series of steps, until a temperature of approximately 1600° C. is reached. (Step 20. FIG. 1). It is during the firing procedure that (1) the volatile components are first driven off (e.g., at 150°–200° C.) through the still porous ceramic layers, (2) the binders are next decomposed and/or reduced, depending upon the atmosphere employed (e.g., at 500°–600° C.), and are thereby eventually vaporized as predominantly low molecular weight hydrocarbons, such as $CH_4$, etc., in the case where a hydrogen atmosphere is used, (3) the ceramic material remaining after the organics have been vaporized, decomposed or reduced, is then heated to higher temperatures, generally in the range of 1500° to 1700° C. to sinter or fuse the ceramic material and cause it to completely "close," that is to say, to reach a gas-impervious state. The sintering and closing of the ceramic material can be facilitated by the addition of minor amounts of foreign substances, such as silicates, and by increasing the surface energy of the ceramic particles.

Very importantly, the metal system chosen for the circuit pattern is caused to adhere to the ceramic layers without microcracking or instability during the firing operation, thereby resulting in very highly conductive, reliable layer or multiple layers of circuit patterns completely contained within a highly refractory, gas-impervious ceramic. As mentioned earlier, the containment of other electrical components within the monolithic ceramic structure of my invention is also feasible.

The resulting structure is monolithic and encloses one or more highly conductive metallic circuit patterns insulated from each other, or may also enclose other electrical interconnecting components, such as resistors or capacitors. The resulting structure has excellent physical strength properties, and excellent heat dissipation and heat insulating characteristics. The structure is truly monolithic, inasmuch as the ceramic material is fused throughout the entire structure. No residual organic material is present.

The details of manufacture of the monolithic material will now be set forth in greater deail.

(I) MAKING OF UNFIRED FLEXIBLE CERAMIC SHEET

As mentioned, the ceramic materials are intermixed with one or more of the plastic resins, plasticizers, solvents and the like to make a flowable mixture. The ceramic materials are those that, when sintered, will produce a high strength, gas-impervious material. The ceramic materials may initially be fired or unfired. A "ceramic material" for the purpose of this specification and these claims is defined as one containing phases which are compounds of metallic and non-metallic elements. The ceramic materials thus include metal carbides, metal nitrides, metal silicides, metal oxides, metal silicates, and metal oxyanion compounds in general, such as metal tungstates and metal molybdates, etc. Typical ceramic materials employed in this invention are alumina ($Al_2O_3$), beryllia (BeO), magnesia (MgO), zirconia ($ZrO_2$), hafnia ($HfO_2$), silica, titania ($TiO_2$), modified barium titanate, mullite, steatite, and fosterite. The above, practical considerations for most applications make alumina the preferred ceramic; and more specifically, a ceramic material that comprises predominantly alumina and, if desired, minor amounts of foreign substances (added primarily to provide sintering and modify crystal growth in the ceramic) is the preferred ceramic material when electrical interconnection is the major function of the system.

The plastic resin materials, utilized to act as temporary binders for the ceramic materials, are required to be solvent-soluble for initial flowability of the ceramic slurry, and to be burnable without distortion so as to not affect the dimensional stability of the ceramic composite unit built up. The plastic resin materials are selected from a wide variety of classes of resins. Examples are polyvinylalcohol, cellulose ethers, ethyl cellulose, cellulose esters, and various acrylic and methacrylic resins. The function of the plastic resins is merely to hold the ceramic granules or powder in a cohesive mass during the various operations required to form a composite unit of metallized ceramic circuitry. Conventional plasticizers for the plastic resins are also employed.

The plastic resin, plasticizer and ceramic materials are thoroughly admixed with a sufficient amount of volatile solvent, e.g., toluene, in order to form a flowable slurry. Ball milling is a presently preferred manner of mixing. The slurry is then formed as by casting into a thin film of the desired thickness, e.g., 1–50 mils. Casting of the sheet onto a smooth surface, such as a polished metal or glass surface is very accurate, a $\pm 0.2$ mil tolerance thereby being readily attainable.

It is also to be noted that it is not necessary to first form a solvent type slurry. The ceramic materials may, for example, be dry pressed with a small amount of dry binder, such as magnesium stearate under high pressures to form the sheet.

The proportion of ceramic material to organic materials (plastic resin and plasticizer) but excluding the volatile solvent, will ordinarily be greater than a 1:1 ratio. The initial ratio of ceramic material to organic material is not critical so long as the formed sheet, after evaporation of the volatile solvent, is cohesive and flexible. We have found that in using alumina as the chief ceramic component only 6–12% organics are generally required, the remainder being substantially alumina. The proportion of organic materials to ceramic materials is not critical, inasmuch as in the later firing procedure the organic materials are all readily decomposed and vaporized, leaving a pure ceramic structure.

The volatile solvent evaporates from the unfired ceramic sheet at a desired rate either at room temperature or at slightly elevated temperatures, depending on the solvent being used. The resulting unfired or green sheet is then readily handled while still being flexible. It can then be readily laminated, punched, shaped, or otherwise machined, without breakage. Depending upon the specifications for a particular composite unit, the ceramic sheet may be required to be built up. This is readily done by laminating the green unfired sheet to similarly formed green unfired sheets under pressures of approximately 3,000–15,000 p.s.i. and temperatures from room temperature up to 200° C. and for short periods of time, e.g., several seconds up to 20 seconds. A completed unfired green ceramic sheet is designated by the numeral 30 in FIGURE 2.

(II) LAYING DOWN CIRCUIT PATTERN

Upon attaining the desired sheet thickness, and as previously indicated, interconnection holes are punched into the sheet 30 if necessary, the holes being indicated by the numeral 32. The metallic circuit pattern 34 is then laid down on the surface of the sheet by conventional methods. One preferred method of application of the desired circuit pattern 34 is by conventional silk-screening techniques. The particular ink containing various metals and vehicles (for carrying the ink) forms an important part of this invention and the preferred and optimum compositions will be discussed in detail.

(III) ENCAPSULATION OF CIRCUIT

Referring specifically to FIGURES 3 through 8, upon application of the metallic circuit pattern 34, a second layer of unfired ceramic sheet 30′, provided with interconnection holes 32′, made as set forth earlier, is laminated upon the just-formed ceramic substrate 30 carrying the metallic circuit 34. The lamination is usually performed under heat and/or pressure, the temperature generally lying between room temperature and 200° C. Pressures within the range 3,000–15,000 p.s.i. are generally utilized. Under these conditions, the plastic resins in the ceramic materials cause both layers to bond permanently together to form a composite unit.

Under high pressure, the ink in the circuit pattern will rise into the interconnection holes 32, 32′ and partially coat the walls of the holes. To insure a complete coating of the holes 32, 32′, the holes are inked in a separate step. Additional circuit carrying ceramic layers with appropriate interconnection holes, such as shown in FIGURE 3, may then be laminated to the already built-up unit 30, 30′ of FIGURE 4. The build-up of lamination is continued for any desired plurality of layers in this fashion. For the sake of clarity, the build-up of only two layers is shown in FIGURES 3 through 8.

(IV) FIRING PROCEDURE

The laminations of the composite unit 30, 30′ are then formed into a monolithic structure 40 (FIGURES 5 and 8) by means of a firing procedure involving heating the composite unit 30, 30′, in an inert or preferably reducing atmosphere, to the sintering temperature of the ceramic material.

While the firing procedure may commence in an air atmosphere, the temperature at which oxidation of the metal components of this invention commences is in the order of 250° C. to 300° C. Therefore, any firing in air is generally restricted to temperatures below about 200–250° C. In general, it is preferred to place the composite unit, to be fired, in the inert or reducing atmosphere at the commencement of the firing procedure.

Referring now to FIGURE 10, which is an illustrative firing profile, and one which is not to be construed as limiting the invention an any way, the laminate composite unit, e.g., as shown in FIGURE 4, is first placed in a conventional oven heated to about 200° C. in an inert, reducing, or air atmosphere for about 30 minutes. The volatiles and solvents are here removed without deleteriously affecting the metallic circuitry of the structure.

If an air atmosphere has previously been employed, it is purged, and the laminate structure is then subjected to an inert non-oxidizing atmosphere such as argon or nitrogen or to a reducing atmosphere such as hydrogen. The use of hydrogen is presently preferred for practical reasons. The temperature is brought up slowly in stepwise fashion, as shown in FIGURE 10, and the plastic resins decompose forming low molecular weight hydrocarbons which escape as gas. It is believed that no carbon is left in the laminate structure after the temperature of the structure has reached 700° C. and has remained there for ten minutes or more.

The temperature is again increased in increments until the sintering temperature of the ceramic is attained. After the laminate structure has reached about 1400–1500° C. (and in FIGURE 10 it is about 1440° C.), the preferred atmosphere employed is basically an inert gas having approximately 10% $H_2$ (to prevent any oxidation of the metallic components). In some instances, a predominantly hydrogen atmosphere may be used to the maximum firing temperature, but in order to avoid corrosion of reducible components used in some ceramic compositions, a low partial pressure of hydrogen is preferred.

It is found that the composite unit 30, 30' fired in the range of between about 1400–1800° C. is effectively "closed," i.e., made gas impervious. The actual temperature at which the sintering rate is satisfactory is determined by the amount and type of additives, such as magnesium silicate, to the ceramic, and by the surface energy originally stored in the ceramic particles.

Referring now to FIGURE 9, the relative resistance is shown of composite conductors, consisting of silver and molybdenum in various proportions, laid down by the printing techniques described, enclosed in a ceramic such as green alumina, and fired to about 1600° C. following the general firing schedule shown in FIGURE 10. The resistance is demonstrated to the lowest when the silver comprises about 30%, by volume, of the total metal present. This corresponds, by order of magnitude, to expectation on the basis of complete void filling in a particle aggregate with the size distribution and particle shape characteristics of the molybdenum powder used.

When silver is present in amounts other than about 30% and ranging from about 10% to about 60%, by volume, with the remainder of the metal system consisting of molybdenum, low electrical resistivities of the Ag-Mo compositions fired in ceramic monolithic structures at 1450° C. to 1600° C. also result, but to a lesser degree, as shown by way of example in FIGURE 9.

The various other specific metal combinations heretofore mentioned, when enclosed in ceramic material, as described, and fired at between about 1400° C. to about 1800° C. in hydrogen, appear to follow the same general curve, as shown in FIGURE 9. In general, when the silver, gold and copper are present in the metal composition in amounts of between about 10% to 60%, by volume, in conjunction with a refractory metal component, i.e., either tungsten or molybdenum comprising the remainder, the composite metal pattern so produced can be effectively employed in this invention.

It is found that the structure 40 produced is a monolithic gas-impervious structure, and that the resistivity of the metal pattern is low. Further, the ceramic portion has suffered no degradation in physical, heat insulating or heat dissipating characteristics. For example, flexural strengths of $1.3 \times 10^8$ p.s.i. are commonly found in the monolithic structure produced in my invention, and the resistivity in the great majority of the cases lies below 0.06 ohm/square at a thickness of the conductor of $3 \times 10^{-3}$ cm.

Because of the high strength and chemical and heat resistance of the structure, the encapsulated circuit can only be damaged or broken by breaking the entire structure.

The use of an inert furnace atmosphere, such as argon, or the use of hydrogen to form a reducing atmosphere during firing does not deleteriously affect the metallic components described herein, and, on the other hand, wholly unexpectedly does not prevent complete breakdown and removal of the organic materials present as binders for the ceramic materials. In prior practice it has been believed than an oxidizing agent, such as oxygen or water vapor, was necessary for the removal of the organic binder at the firing of green ceramics, and that consequently, a reducing atmosphere such as pure nitrogen could not be employed in the firing procedure until the organic components had been oxidized. We have established in the present invention that the organic components can be quickly and easily removed by reaction with pure hydrogen to form water and hydrocarbons of low molecular weight. Pure hydrogen can consequently be used as a furnace atmosphere from the very beginning of the firing of the green ceramic.

Specific examples of the method for the manufacture of the monolithic structures of my invention follow:

Example 1

A green alumina sheet was made as follows: The following ingredients were admixed in a ball mill:

| | | |
|---|---|---|
| Ethylene dichloride | ml | 1500 |
| Alumina (containing 6% talc) | gms | 3000 |
| Acryloid [1] | gms | 600 |
| Santicizer #160 [2] | gms | 200 |

[1] An acrylic polymer, mfrd. by Rohm & Haas.
[2] Santicizer #160 is a plasticizer mfrd. by Monsanto Chemical Co., Chemicals (Organic) Div.

The ball mill thoroughly admixed these ingredients for a period of 24 hours ±1 hour. The resulting slurry was cast onto a flat smooth surface to a predetermined thickness which, in this example was 2.7 mils ±0.2 mils.

The solvent, ethylene dichloride, was evaporated at a low temperature and the resulting tape was built up to a thickness of 21.6 mils by lamination of eight layers of tape at a temperature of 150° C. and 5,000 p.s.i. for a 10-second time period.

The 21.6 mil thick alumina "green" alumina sheet was silkscreen printed with a circuit pattern using an ink having the following composition:

| | Percent by volume |
|---|---|
| Pine oil | 80 |
| Gold | 10 |
| Molybdenum | 10 |

A 5.0 mil thick alumina sheet, with punched interconnection holes, was laminated to the 21.6 mil thick alumina sheet under 5,000 p.s.i. pressure and 150° C. temperature for a 10-second time period.

The laminate was then put in a kiln having a hydrogen. atmosphere. The temperature was slowly increased to 1400° C. where it was maintained for 30 minutes. The kiln was then turned off and allowed to cool to 200° C. and the unit removed.

The resistivity of the circuit pattern in the thus produced composite unit was very low. The circuit pattern, encapsulated within the ceramic unit, had a length of 129.5 mm., a width of 0.4 mm. and a thickness of 0.06 mm. Its total resistance was 13.5 ohms, the resistivity being 0.042 ohm per square dimension, at the thickness used.

Example 2

In this example, a metal combination of 10% silver and 90% molybdenum was deposited onto the ceramic substrate, all other conditions of processing and materials being substantially the same as in Example 1.

The flexural strength of the monolithic ceramic structure was about $1.3 \times 10^8$ p.s.i. and the resistivity was approximately the same as in Example 1.

Although the invention has been described with reference to several particular embodiments, it will be understood to those skilled in the art that the invention is capable of a wide variety of alternative embodiments. I therefore intend to be limited only by the spirit and scope of the appended claims.

I claim:

1. A monolithic ceramic electrical interconnection system which comprises:

a sintered monolithic ceramic;

a first electrically conductive electrical interconnection means, encapsulated within said sintered ceramic comprising:

(a) from between about 10% to 60%, by volume, of a metal selected from the group consisting of silver, gold and copper, and (b) the remainder comprising a metal selected from the group consisting of tungsten and molybdenum; and a second electrically conductive means for electrically connecting said first electrical interconnection means to an outside point.

2. The monolithic ceramic electrical interconnection system of claim 1 wherein said first electrical interconnection means is a circuit pattern.

3. The monolithic ceramic electrical interconnection system of claim 1 wherein said first electrical interconnection means is a circuit pattern having a resistivity of less than about 0.1 ohm per square dimension and per 1 mil in thickness.

4. The monolithic ceramic electrical interconnection system of claim 1 wherein said ceramic is predominantly alumina.

5. The monolithic ceramic electrical interconnection system of claim 1 wherein said ceramic is approximately 94% alumina and the remainder is magnesium silicate.

6. The monolithic ceramic electrical interconnection system of claim 1 wherein said electrically conductive means comprises at least one hole leading from a portion of said electrical interconnection system to an outside point, said hole having an electrically conductive metal deposited therein.

References Cited

UNITED STATES PATENTS

| | | | |
|---|---|---|---|
| 2,441,960 | 5/1948 | Eisler. | |
| 2,711,983 | 6/1955 | Hoyt. | |
| 3,040,213 | 6/1962 | Byer et al. ------ | 174—68.5 XR |
| 3,162,717 | 12/1964 | Lentz --------------- | 174—36 |
| 3,189,978 | 6/1965 | Stetson. | |

DARRELL W. CLAY, *Primary Examiner.*

U.S. Cl. X.R.

339—17; 117—212; 29—625